H. H. KENSHOLE.
NON-SKIDDING DEVICE FOR WHEELS OF VEHICLES.
APPLICATION FILED JAN. 8, 1907.

899,056.

Patented Sept. 22, 1908.
2 SHEETS—SHEET 1.

H. H. KENSHOLE.
NON-SKIDDING DEVICE FOR WHEELS OF VEHICLES.
APPLICATION FILED JAN. 8, 1907.

899,056.

Patented Sept. 22, 1908.

2 SHEETS—SHEET 2.

UNITED STATES PATENT OFFICE.

HENRY H. KENSHOLE, OF ILFORD, ENGLAND.

NON-SKIDDING DEVICE FOR WHEELS OF VEHICLES.

No. 899,056.  Specification of Letters Patent.  Patented Sept. 22, 1908.

Application filed January 8, 1907. Serial No. 351,384.

*To all whom it may concern:*

Be it known that I, HENRY HARDING KENSHOLE, engineer, a subject of the King of Great Britain, residing at The Elms, Goodmayes, Ilford, in the county of Essex, England, have invented a certain new and useful Improved Non-Skidding Device for Wheels of Vehicles, of which the following is a specification.

My invention relates to an improved device for automatically preventing the skidding or side slipping of the wheels of road vehicles.

According to my invention I mount an eccentric sheave or bearing boss upon the axle near to the wheel or between two parts of a wheel, means being provided whereby when lateral or axial motion is applied the eccentric boss is more or less rotated to bring its eccentricity towards the road. Upon this boss is rotatably mounted a disk or dummy wheel formed with a serrated or other form of rim, so that when the tendency to side slipping reaches a certain predetermined value, the boss is driven laterally against a spring and being simultaneously rotated causes the center of rotation of the disk to be lowered and thereby brings the serrated or other edge of the disk into contact with the road.

Figure 1:
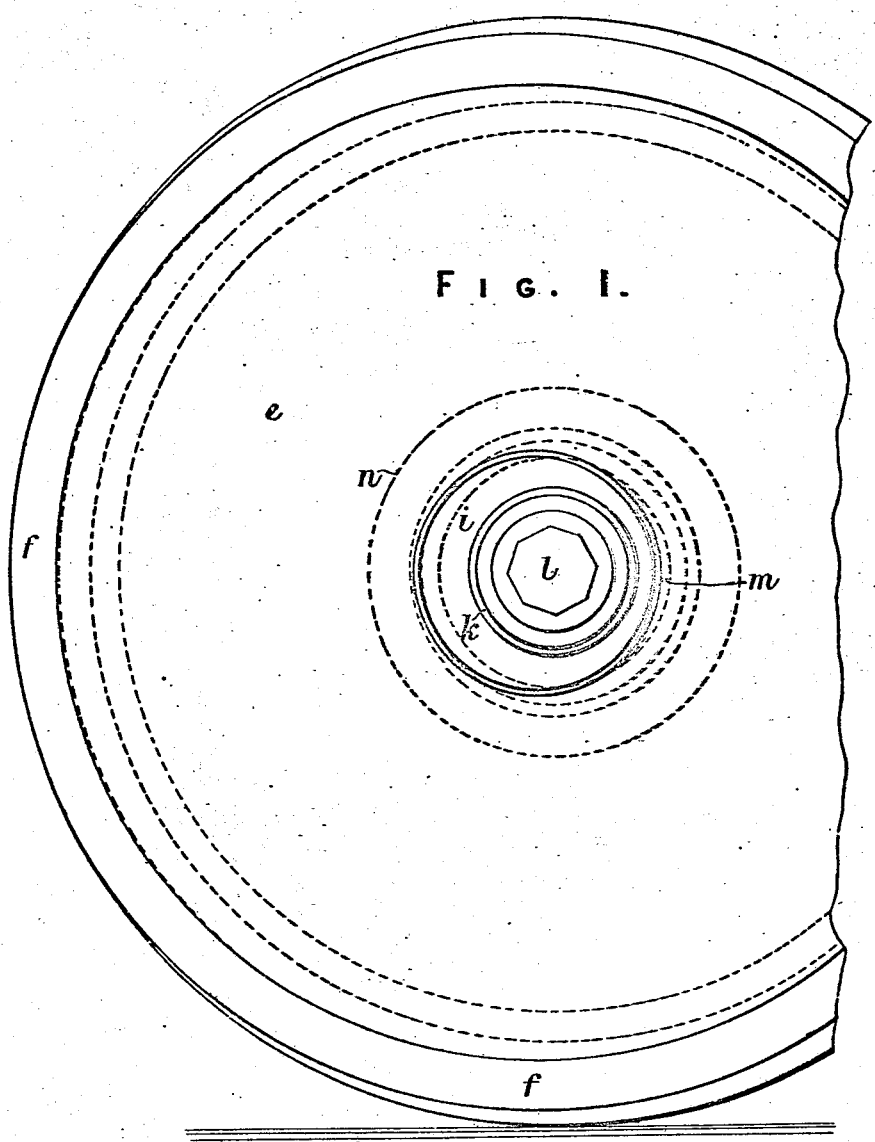
Figure 2:
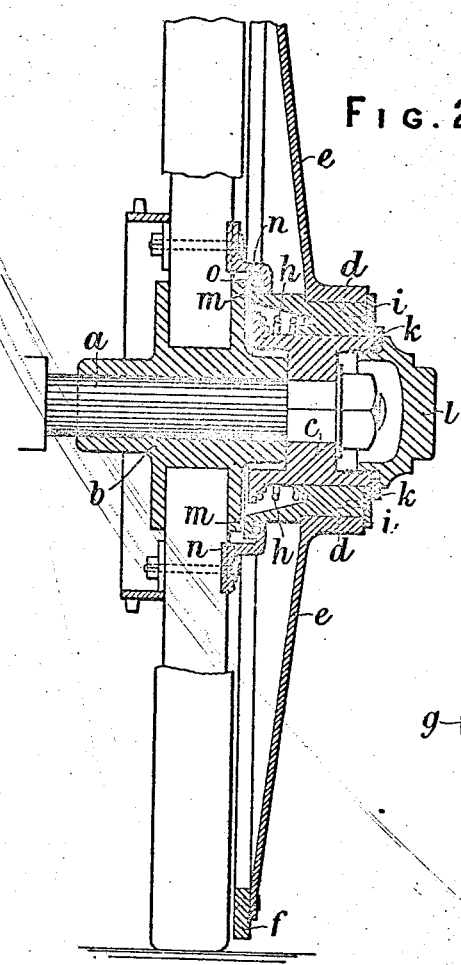
Figure 3:
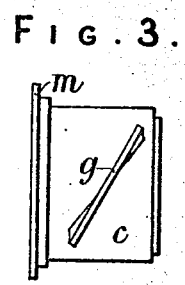
Figure 4:
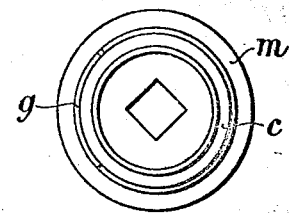

In the accompanying drawings, Figure 1 is an elevation and Fig. 2 is a vertical section illustrating an example of construction of my invention applied to the wheel of a motor road vehicle fitted for chain transmission. Figs. 3 and 4 are detail views.

*a* is the fixed axle upon which the hub *b* of the wheel is free to rotate; it is made longer than usual to allow of the hub also sliding upon the axle to a limited extent. The squared end of the axle carries a concentric boss *c* fixed thereto, said boss *c* carrying an eccentric sheave or boss *d* upon which a disk or dummy wheel *e* is free to rotate.

In the drawings the disk is shown as being slightly dished and provided with a rim *f;* ball bearings may be fitted if desired in any well known manner. The eccentric sheave is made to receive a volute web or feather or webs or feathers *g* fixed to the boss *c*, (Figs. 3 and 4), analogous to a nut upon a single or multiple screw thread or threads and a spring *h* is provided to offer elastic resistance to the turning and lateral motions of the eccentric sheave *d*. In the example shown, the disk *e* is held in position by the annular flange plate *i* screwed or otherwise attached to the eccentric sheave *d*, and the boss *c* is provided with an annular flange ring *k* which may be held in position by the cup *l*, the latter being screwed into the end of the boss *c* or otherwise fixed. The eccentric shaft *d* is connected to the wheel in such a manner that the two move laterally as one piece while permitting either to rotate independently of the other. As shown, this may be effected by a concentric flange *m* on the sheave *d* and an annular flanged plate *n* fixed to the wheel, ball bearings *o* or other approved anti-friction device being preferably provided to reduce friction.

It will be seen that, simultaneously with lateral movement of the wheel upon its axle, the eccentric shaft *d* is drawn with it and at the same time partially rotated by the thread *g* so as to bring the center of the dummy wheel nearer the road and cause the disk to come into contact with the road and thereby prevent or arrest skidding or side slipping. The lateral motion of the wheel on its axle or the rotary motion of the eccentric boss may be utilized to liberate or deliver sand from a sand box to the road close to the wheel.

I claim:

1. A non-skidding device for wheels of vehicles comprising a dummy wheel mounted alongside the vehicle wheel, means allowing of lateral motion of said vehicle wheel upon its axle, a rising and falling bearing carrying said dummy wheel, and automatic operating and connecting means between said bearing and said vehicle wheel to raise and lower said dummy wheel.

2. A non-skidding device comprising a vehicle wheel mounted to slide as well as rotate upon its axle, a dummy wheel mounted to rotate alongside the vehicle wheel, a vertically movable bearing carrying said dummy wheel, means connecting the said wheels and means raising and depressing said dummy wheel.

3. A non-skidding device comprising a vehicle wheel capable of sliding as well as rotating upon its axle, a concentric boss fixed on said axle, an eccentric bearing boss mounted to rotate on said concentric boss, a dummy wheel mounted to rotate on said bearing boss means connecting the vehicle wheel with the eccentric bearing boss, and means partially rotating said bearing boss when said vehicle wheel slides upon its axle, as set forth.

4. A non-skidding device comprising a vehicle wheel capable of sliding as well as rotating upon its axle, a dummy wheel mounted alongside the vehicle wheel and means depressing said dummy wheel into contact with the road, said means comprising a concentric bearing boss fixed on said axle, an eccentric boss mounted to rotate on said bearing boss a helical connection between said bosses, a concentric flange on said eccentric boss, an annular flange plate on said vehicle wheel engaging said boss flange, and a spring adapted to return said eccentric boss to its normal position, as set forth.

In testimony whereof, I have hereunto set my hand in presence of two subscribing witnesses.

HENRY H. KENSHOLE.

Witnesses:
GEORGE C. DOWNING,
WALTER J. SKERTEN.